Dec. 25, 1934.   E. V. TAYLOR   1,985,672
BRAKE
Filed Jan. 18, 1930
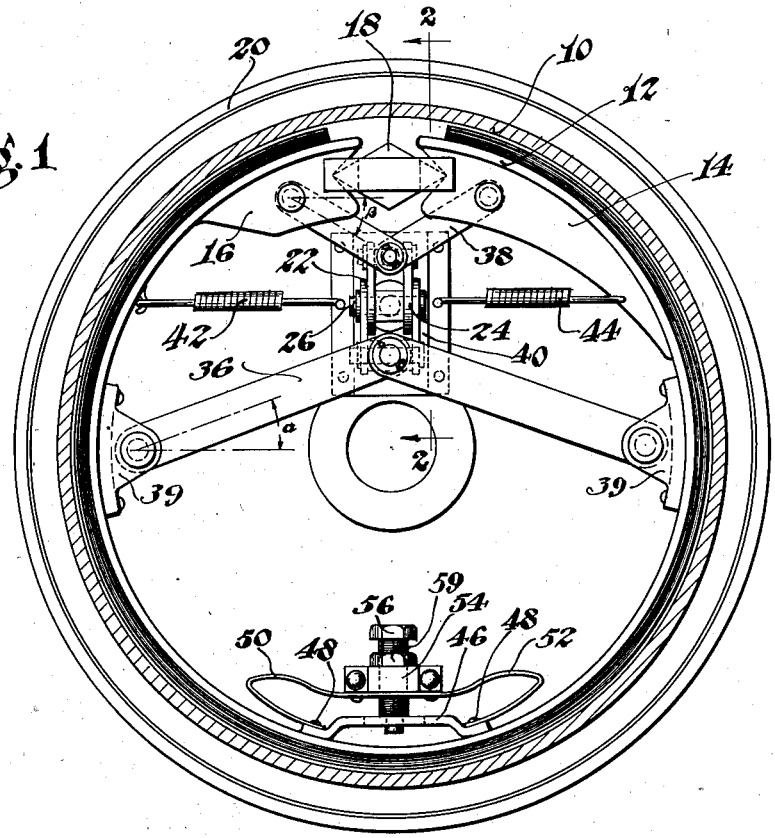
Fig. 1
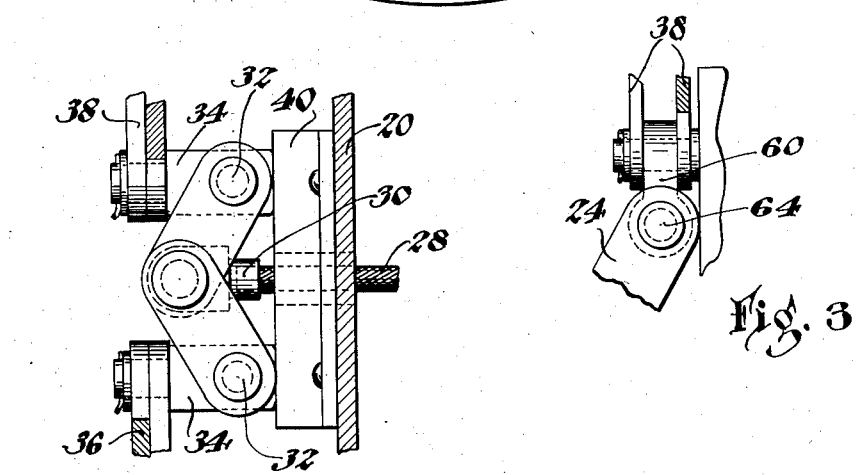
Fig. 2
Fig. 3
INVENTOR.
Eugene V. Taylor
BY H. O. Clayton
ATTORNEY Patented Dec. 25, 1934

1,985,672

UNITED STATES PATENT OFFICE 1,985,672

BRAKE

Eugene V. Taylor, Chicago, Ill., assignor to Bendix Brake Company, South Bend, Ind., a corporation of Illinois Application January 18, 1930, Serial No. 421,641

16 Claims. (Cl. 188—78)

This invention relates to brakes and is illustrated as embodied in an internal expanding brake for automotive vehicles of the band type.

In brakes of this type, wherein a liberal lining clearance is necessary, it is oftentimes difficult to provide an efficient, yet simple, control or operating mechanism. It is a major object of my invention therefore to provide an extremely effective toggle type applying means for the band, so designed as to positively predetermine the degree of applying pressures transmitted to spaced portions thereof.

To the above end, I have provided a novel combination of toggles for spreading the annular band into drum contact wherein a floating two-part toggle, movable in a plane substantially perpendicular to the plane of the brake, serves to actuate a plurality of floating toggles operating in opposite directions, the latter movable in the plane of the brake. I furthermore suggest constructing the first mentioned toggle so that the same may be applied by a flexible tension element such as a cable acting perpendicular to the plane of the brake.

Further objects of my invention, and desirable details of structure, including a brake centering, stop and return mechanism a torque or reaction block and certain combination of parts will become apparent from the following detailed description of a preferred embodiment of my invention and in the accompanying drawing, in which:

Figure 1 is a view taken just inside the head of the brake drum showing the elements of my novel brake in side elevation;

Figure 2 is a sectional view taken on line 2—2 of Figure 1 disclosing in side elevation a portion of my novel toggle applying means; and Figure 3 discloses a fragmentary portion of a modified form of toggle connection.

As clearly disclosed in Figure 1, the brake mechanism comprises in its essential details a rotatable drum 10 adaptable for engagement with an annular lining covered transversely split steel band 12. The band is reinforced at its ends by radially extending relatively long and short web portions 14 and 16, provided with V shaped notches arranged in oppositely disposed relation for the reception of a diamond shaped anchor or torque reaction block 18, rigidly secured to a support plate 20 for the brake mechanism. This plate is positioned at the open end of the drum and supports the mechanism within the drum.

As previously indicated, with brakes of this type it is necessary to provide a substantial lining clearance with the band in its inoperative position making necessary an applying mechanism which is effective in operation and which first quickly compensates for said clearance and thereafter firmly forces the band into drum engagement. It is therefore an important feature of my invention to provide means for effecting this desired application of the band.

Parallel actuating toggle linkages 22 and 24 movable in a plane perpendicular to the plane of the brake, the hub portions of said linkages being swiveled upon a pivot pin 26 movable bodily laterally toward the support plate 20, to open the combined toggle linkages, by a flexible tension element such as a steel cable 28 swiveled at its end to a pin by a suitable fitting 30.

Pins 32, joining the ends of the aforementioned toggle are journaled in pins 34, also extending perpendicular to the plane of the brake, which latter pins serve, at their reduced ends, as the hub pivots of oppositely extending toggles 36 and 38 pivotally connected respectively to brackets 39 on the band and to the webs 14 and 16. The upper toggle 38 comprises links movable upwardly under the action of the actuating toggle, the lowermost toggle 36 preferably comprising relatively long links operating downwardly toward the base of the brake. The reaction of the links of the actuating toggle is taken by a relatively thick plain-faced reaction block 40 rigidly secured to the support plate 20. Return springs 42 and 44 are secured at their respective ends to the aforementioned reaction block and to the band, the same serving to draw the band ends together to determine the inoperative position of the brake. Spring 44 is preferably made strong enough to maintain the web 14 in contact with the reaction block 18 during initial application of the brake, thus obviating the undesirable anchoring click or noise that would otherwise ensue.

According to another important feature of my invention, there is provided a combined brake, centering, return and stop structure disclosed in the lower portion of the brake illustrated in Figure 1. This structure preferably comprises a stamping 46 rigidly secured as by screws 48 at its offset ends to the inner face of the band. Said screws also serve to clamp tension return bent or C-shaped leaf springs 50 and 52 underlying and secured to the ends of a U-shaped bracket 54, the latter rigidly secured to the support plate. The bracket 54 is preferably enlarged at its central portion and internally threaded to receive a hex-headed bolt member 56. The bolt may be provided with a projection at its end of lesser diameter than the bolt, said projection forming, with the body of the bolt, a shoulder contacting the edges of a slot in the bracket 54. A lock nut 59 serves to preserve the adjustment of the stop.

The construction just described is claimed in my divisional application No. 714,296, filed March 6, 1934.

I have disclosed, in Figure 3, a slightly modified form of toggle structure, wherein the shank portion of an eye link 60 pivotally supports a pin 62, the latter pivotally supporting at its ends the links of the aforementioned upper and lower toggles. The head of the eye link is swiveled upon a pin 64 connecting the ends of the links of the actuating toggle.

In operation, actuation of the cable 28, suitably connected by power transmission linkage to the service pedal of the car, serves to actuate the toggle structure 22 and 24 opening toggles 36 and 38 to force the band into drum engagement. There being no fixed connection between the links of the various toggles and the backing or support plate, the only connection of said toggles being with the cable and the band, the same form, in effect, afloating applying mechanism. The forces applied to the hubs of the toggles 36 and 38 are therefore balanced at all times, the forces distributed to the various portions of the band being solely dependent on the angles alpha and beta, that is the angles between the links of the toggles 36 and 38 and the lines joining the joints of said links with barckets 54 and webs 14 and 16 respectively. It will be noted that as the angles alpha and beta decrease and the links approach a straight line, the forces applied to the band will increase until the respective angles reach zero, whereupon the forces applied to the band become infinite. Accordingly, by choosing what may be termed the "spread" of the upper and lower toggles, that is, by predetermining the relative angularity of alpha and beta, pressures may be so distributed to the ends and central portions of the bands as to effect the desired actuation of the brake at these points.

It would appear desirable to so proportion the parts as to transmit equal forces to the band and I have so designed the parts to effect this result. It should also be noted that the movement of separation of the links of the toggles 36 and 38 is quite rapid when the angles alpha and beta are great and that this same relative motion reduces as the angles decrease. This peculiarity permits the band to be held an appreciable distance away from the brake drum when the brake is not in action, which original clearance can be taken up quite rapidly and the shoes brought quickly into operative contact with a very small movement of the toggle links, a condition that is ideal for the functions desired.

Once applied in drum contact, the band is wiped around by frictional drag of the drum, being securely wrapped into close engagement therewith to effect the desired braking function. The reaction or anchoring of the band is taken by one or the other of the ends of the block 18 depending upon the direction of the drum rotation. During this action, the stop pin 56 moves through the slot in the bracket 54, the return or C springs 50 or 52 becoming distorted. Upon release of the brake, the bracket 46 under action of the stressed return springs moves upwardly against the shouldered portion of the pin 56 to determine, at least in part, the released position of the brake. The flexible springs 50 and 52 bent within their elastic limits return to their original shape, thus definitely effecting both the return and centering function. The lining clearance may be adjusted to compensate for wear of the brake by merely loosening the lock nut and screwing down the bolt 56. The springs 42 and 44 obviously also aid in returning the band to its inoperative position.

There is thus provided a very compact and extremely effective applying means for a brake of this type permitting relatively large lining clearances to be effectively taken up and also insuring a forceful application of the band to the revolving drum.

While several illustrative embodiments of my invention have been described in detail, it is not my intention to limit the invention to those particular embodiments or otherwise than by the terms of the appended claims.

I claim:

1. A brake comprising a rotatable drum, a substantially circular shaped friction device having separable ends, means for expanding said device into drum contact comprising a plurality of interconnected toggles, at least two of said toggles movable in the plane of the brake.

2. A brake comprising a rotatable drum, an annular friction device having a pair of adjacent separable ends, means for separating said ends and expanding said device into drum contact comprising a plurality of interconnected toggles, two of said toggles movable in the plane of the brake, one of said latter toggles being secured to the aforementioned separable ends.

3. A brake comprising a rotatable drum, a friction device adapted to be expanded into drum contact, together with floating means for expanding said device comprising a plurality of interconnected toggles, one of which is movable in a plane perpendicular to the plane of the brake.

4. A brake comprising a rotatable drum, a friction band adapted to be expanded into drum contact, together with means for expanding said band comprising a plurality of interconnected toggles, one of which is movable in a plane perpendicular to the plane of the brake to actuate other toggles movable in the plane of the brake.

5. A brake comprising, in combination, a rotatable drum, a friction device having separable ends adapted to be thrust into drum engagement, together with floating toggle means for actuating said ends, said means comprising a two-part toggle opening in a plane perpendicular to the plane of the brake and imparting movement to a toggle moving in the plane of the friction device, said last-mentioned toggle connected to the separable ends of the device.

6. A brake comprising, in combination, a rotatable drum, a friction device having separable ends adapted to be thrust into drum engagement, together with floating toggle means for actuating said ends, said means comprising a two-part toggle opening in a plane perpendicular to the plane of the brake and imparting movement to a toggle moving in the plane of the friction device, said last-mentioned toggle connected to the ends of the device, said two-part toggle coacting with a plane-faced reaction block positioned within the friction device.

7. A brake comprising, in combination, a rotatable drum, a friction device within said drum having separable ends and means for separating said ends comprising toggles secured to the ends and center of said device, said toggles operable by means of a two-part toggle opening in a plane perpendicular to the plane of the brake.

8. A brake comprising a continuous flexible band having adjacent ends, a toggle associated with the adjacent ends, for spreading said ends, a second toggle acting substantially diametrically across said brake to further spread said band, and common means for actuating both toggles.

9. A brake comprising a single continuous friction band having adjacent ends, a pair of toggles lying in the plane of said brake for expanding said band, and common means for actuating both toggles.

10. A brake comprising a single continuous friction band having adjacent ends, a pair of toggles to expand said band, and toggle means common to each of the first mentioned toggles, to operate said pair simultaneously.

11. A brake comprising friction means, having adjacent separable ends, a toggle for expanding said ends, a second toggle acting substantially diametrically across said brake to further expand said friction means, and common actuating means for simultaneously actuating both toggles.

12. A brake comprising friction means having adjacent separable ends, expanding means for expanding said ends, a second expanding means engaging parts of the friction means to further expand said friction means, and actuating means including a toggle connected to and operable for simultaneously actuating both of said expanding means and including a tension element whose end extends at right angles to the plane of said brake and is connected to said toggle.

13. A circular brake shoe expanding mechanism comprising a peripheral expanding means, acting to directly expand the periphery of said shoe, and an auxiliary expanding means acting on diametrically opposite parts of said shoe for further expanding said shoe.

14. A circular brake shoe expanding mechanism comprising a peripheral expanding means, acting to directly expand the periphery of said shoe, an auxiliary expanding means acting on diametrically opposite parts of said shoe for further expanding said shoe, and common actuating means for both expanding means.

15. A brake shoe expanding mechanism comprising expanding means acting to directly expand the periphery of said shoe, associated by common actuating means with a second expanding means, and a tension element extending at its end at right angles to the plane of the brake and connected to said common actuating means.

16. A brake comprising friction means, having adjacent separable ends, anchor means for said ends, a floating toggle lying in the plane of said brake for expanding said ends, other toggle means for expanding said friction means, and a toggle lying in a plane perpendicular to the brake plane for simultaneous actuation of said floating toggle and said toggle means.

EUGENE V. TAYLOR.